United States Patent [19]
Yoneyama

[11] Patent Number: 6,124,978
[45] Date of Patent: Sep. 26, 2000

[54] PROJECTION LENS

[75] Inventor: Kazuya Yoneyama, Omiya, Japan

[73] Assignee: Fuji Photo Optical Co., Ltd., Omiya, Japan

[21] Appl. No.: 09/327,961

[22] Filed: Jun. 8, 1999

[30] Foreign Application Priority Data

Jul. 23, 1998 [JP] Japan .................................. 10-207284

[51] Int. Cl.⁷ .............................. G02B 3/00; G02B 15/14
[52] U.S. Cl. ............................................ 359/649; 359/680
[58] Field of Search .................................... 359/642, 649, 359/680, 681, 682

[56] References Cited

U.S. PATENT DOCUMENTS 2,687,063   8/1954   Coleman .

FOREIGN PATENT DOCUMENTS 7-294809   11/1995   Japan .

Primary Examiner—Georgia Epps
Assistant Examiner—Michael A Lucas
Attorney, Agent, or Firm—Arnold International; Bruce Y. Arnold

[57] ABSTRACT

A projection lens is disclosed having a low F-number of 1.7, which uses only a small number of lens elements and wherein various aberrations are favorably corrected. By satisfying certain prescribed conditions, the maximum angle of a principal ray relative to the optical axis on the reducing side of the projection lens is made to be 2.5 degrees or less, and the projection lens is made to be compact so that a back surface of a translucent liquid crystal display can be illuminated nearly telecentrically, i.e., with light that is nearly orthogonal to the surface of the liquid crystal display. The projection lens is constructed of, in order from the enlarging side of the projection lens: a positive first lens element $L_1$, and a negative second lens element $L_2$, a negative third lens element $L_3$ that is cemented to a positive fourth lens element $L_4$, a positive fifth lens element $L_5$, and a positive sixth lens element $L_6$.

20 Claims, 9 Drawing Sheets

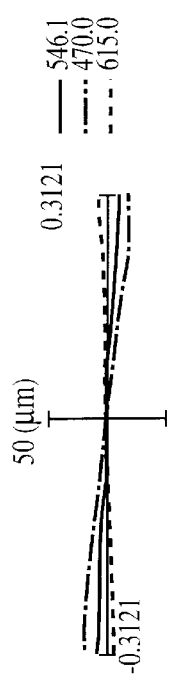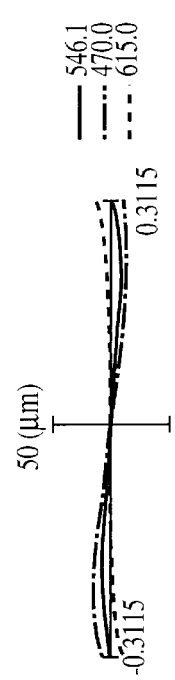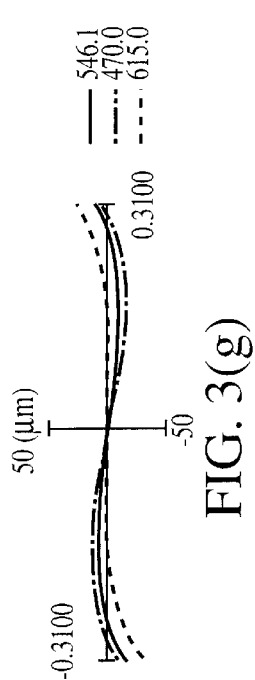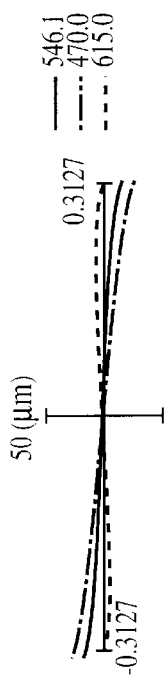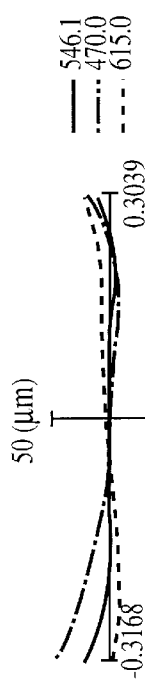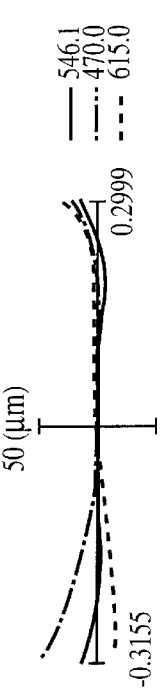

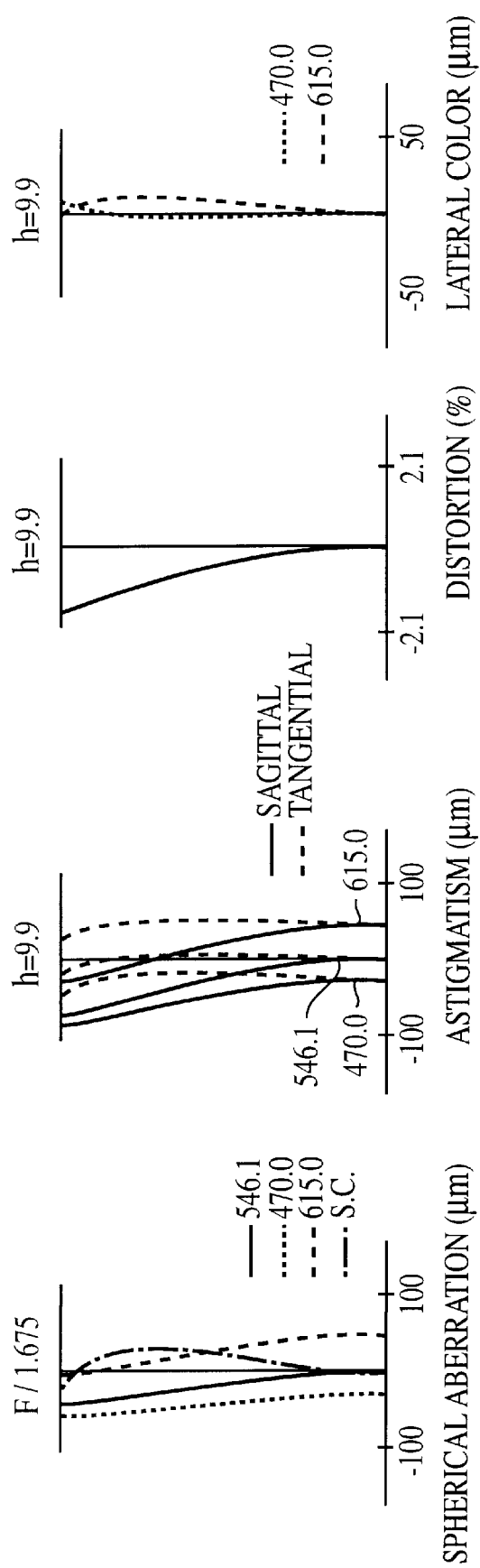

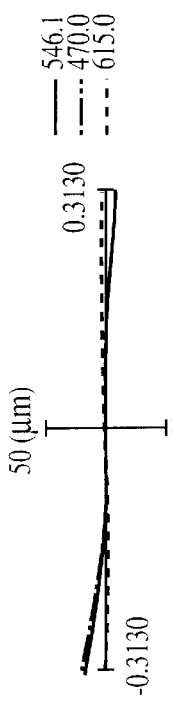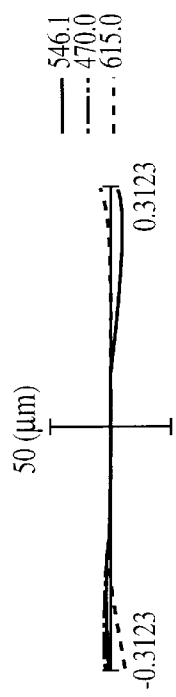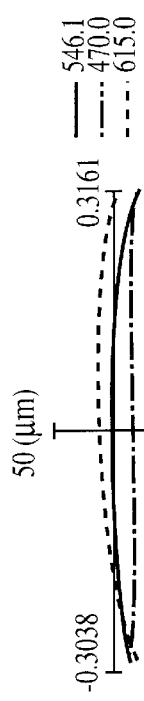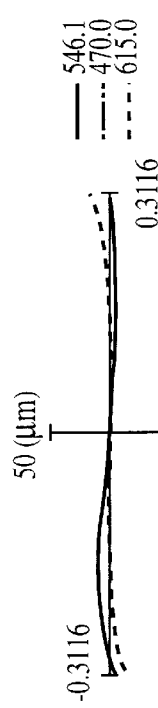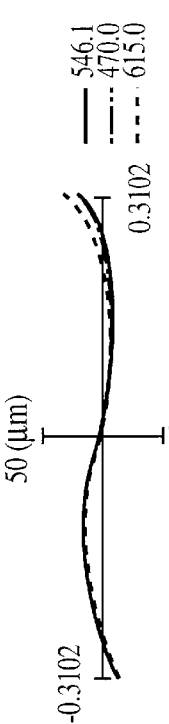

PROJECTION LENS

BACKGROUND OF THE INVENTION

Various types of projection lenses are known which are used in video and other projectors having a liquid crystal panel as an image source to modulate a light beam. In this type of projector, light illuminates the liquid crystal display on its back side and passes through liquid crystal picture elements which serve to modulate the light with a picture image that is electrically input to the liquid crystal display. The light is then projected onto a screen by the projection lens, which is arranged after the liquid crystal display so as to form an enlarged image on the screen. Herein, the side of the projection lens on which the liquid crystal display is intended to be located will be referred to as the reducing side, and the side of the lens on which an enlarged image is formed on a screen will be referred to as the enlarging side. Since the percentage of light attenuation in a liquid crystal display serving as a light modulator is comparatively large as a result of the light having to be incident orthogonally onto its back surface for proper operation of the display, it is important that the projection lens be designed with a high optical efficiency so as to not further attenuate the light any more than can be avoided. Therefore, the projection lens should be designed to be nearly telecentric on its reducing side and to have high optical efficiency. In addition, there is strong market demand for the entire device to be light weight as well as compact. Therefore, small scale lens elements as well as the use of a small number of lens elements is desired in such a projection lens.

Japanese Laid-Open Patent Application 7-294809 and U.S. Pat. No. 2,687,063 disclose conventional projection lenses which have a relatively low F-number, and wherein various aberrations are favorably corrected despite the projection lens having only a small number of lens elements.

The projection lens described in Japanese Laid-Open Patent Application 7-294809 has a relatively bright image, in that its F-number value is about 2.0. However, there is peripheral darkening in that the projection lens is not telecentric on its reducing side, with the maximum angle of a principal ray relative to the optical axis (hereinafter termed the telecentric angle) on the reducing side of the projection lens being as large as 6 degrees.

The projection lens described in U.S. Pat. No. 2,687,063 forms a brighter image, in that its F-number is 1.7. However, again there is unnecessary peripheral darkening since the telecentric angle may be as large as 5 degrees. Furthermore, the distortion is too large for this lens to be used as a projection lens in state-of-the-art projectors.

BRIEF SUMMARY OF THE INVENTION

A first object of the present invention is to provide a projection lens wherein favorable aberrations are obtained, despite the lens having a small number of lens elements.

A second object of the invention is to provide a lens having a low F-number so that a bright image is obtained.

A third object of the invention is to provide a projection lens that is nearly telecentric on its reducing side, so that there will be little peripheral darkening of the image.

A fourth object of the invention is to provide a projection lens that is compact and has a small overall length.

BRIEF DESCRIPTION OF THE DRAWINGS

The present invention will become more fully understood from the detailed description given below and the accompanying drawings, which are given by way of illustration only and thus are not limitative of the present invention, and wherein:

FIGS. 3(a)–3(g) show the coma of the projection lens of Embodiment 1, FIGS. 4(a)–4(d) show the spherical aberration, astigmatism, distortion and lateral color, respectively, of the projection lens of Embodiment 2, FIGS. 7(a)–7(g) show the coma of the projection lens of Embodiment 3.

DETAILED DESCRIPTION

Figure 1:
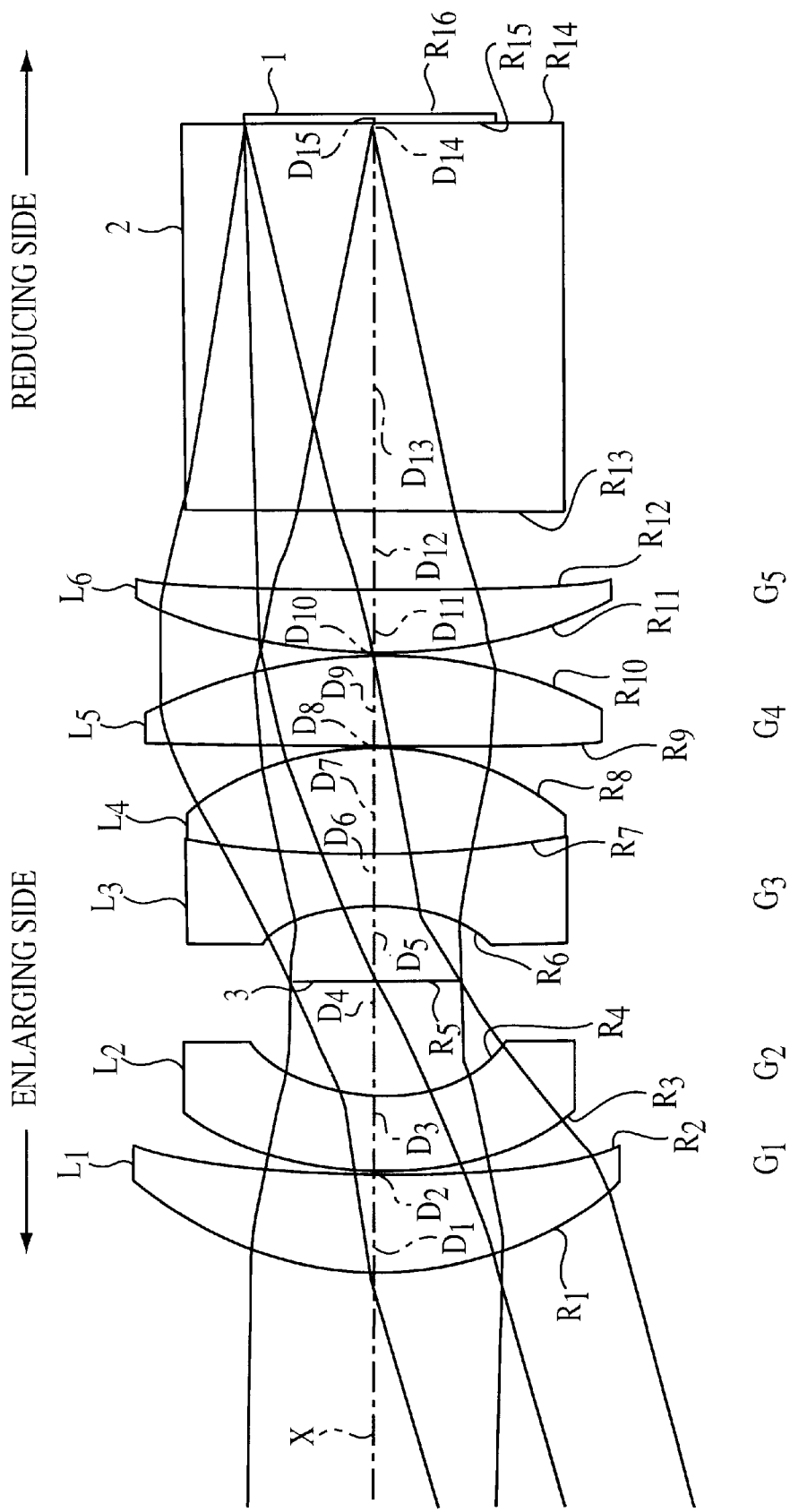
FIG. 1 shows the basic lens element construction that relates to Embodiments 1–4 of the present invention.
Figures 2A, 2B, 2C, 2D:
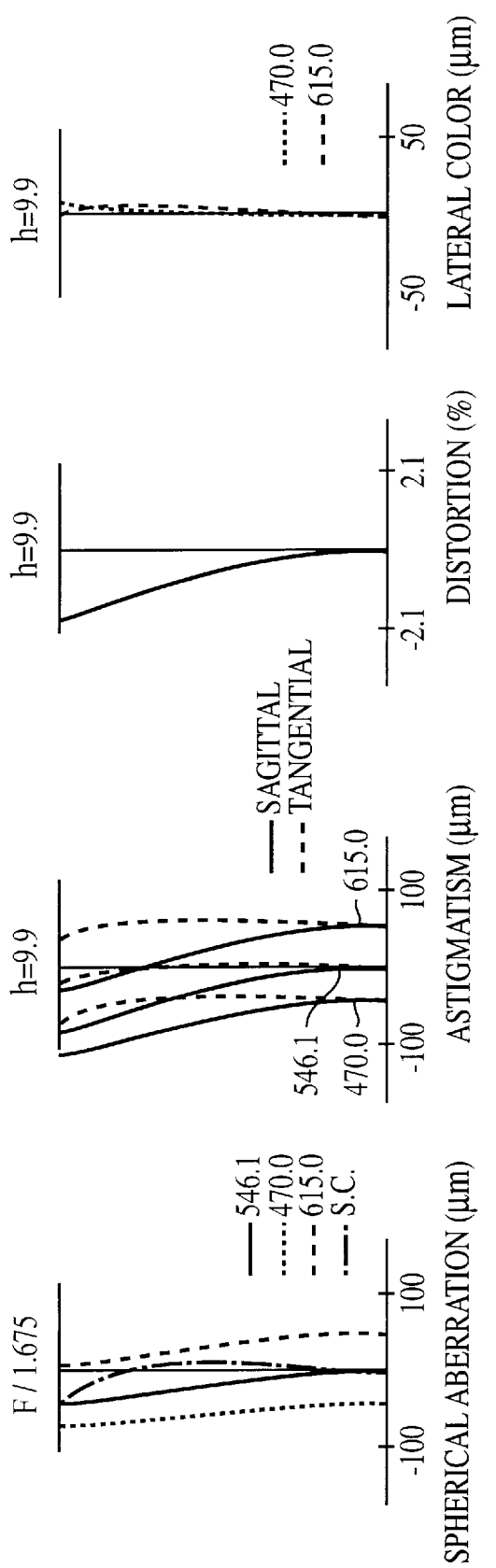
FIGS. 2(a)–2(d) show the spherical aberration, astigmatism, distortion and lateral color, respectively, of the projection lens of Embodiment 1.
Figure 5A:
FIGS. 5(a)–5(g) show the coma of the projection lens of Embodiment 2.
Figure 5B:
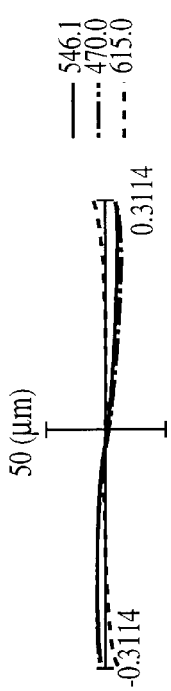
Figure 5C:
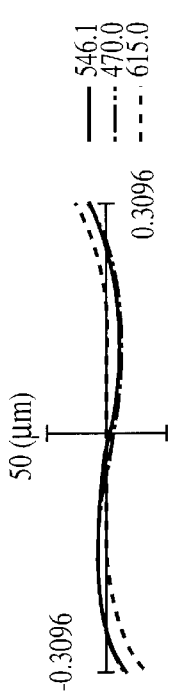
Figure 5D:
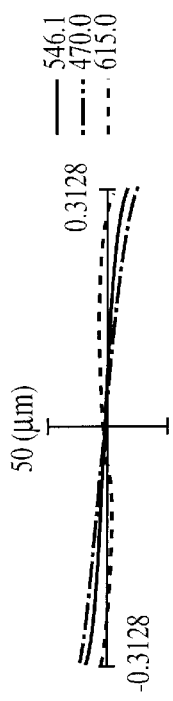
Figure 5E:
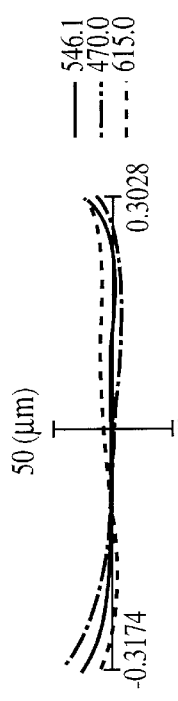
Figure 5F:
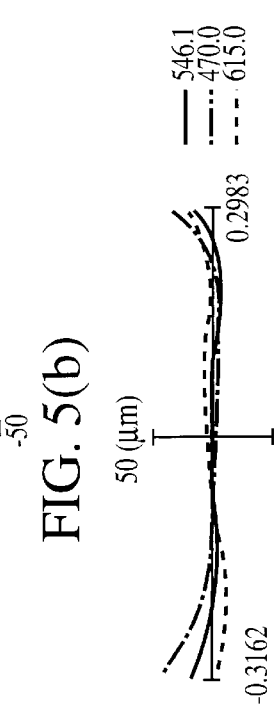
Figure 5G:
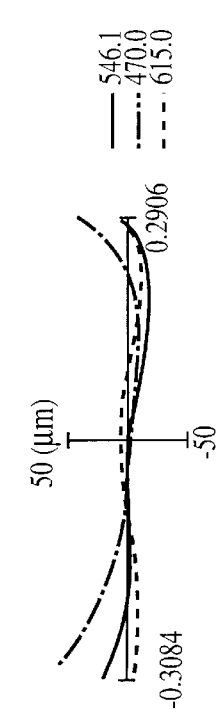
Figures 6A, 6B, 6C, 6D:
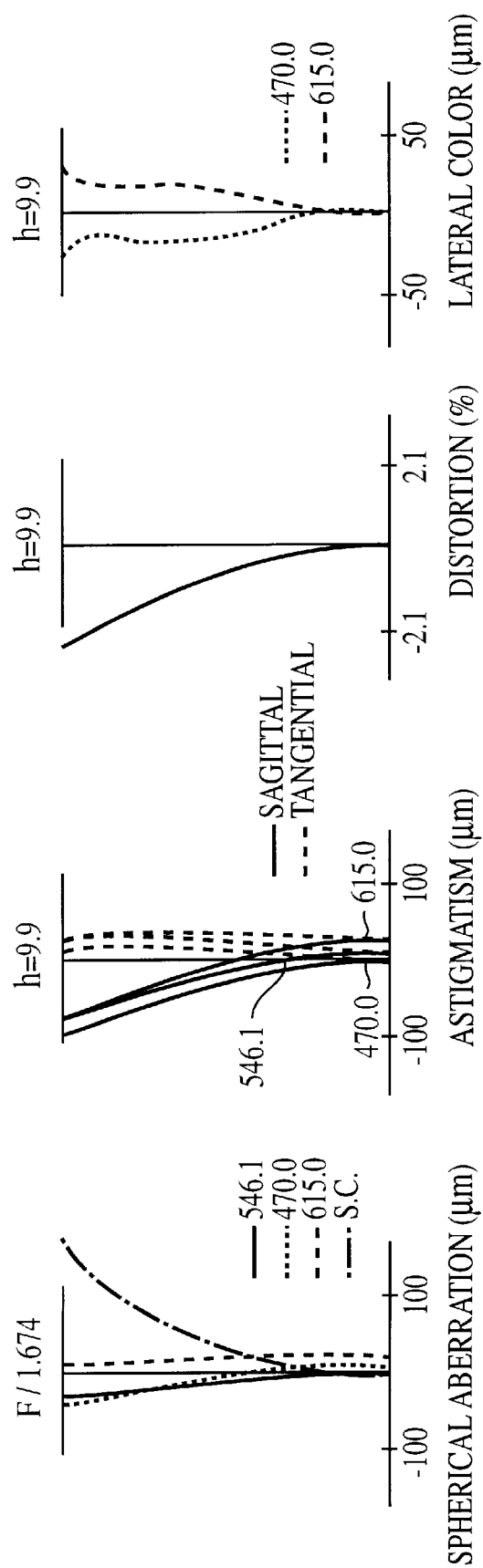
FIGS. 6(a)–6(d) show the spherical aberration, astigmatism, distortion and lateral color, respectively, of the projection lens of Embodiment 3.
Figure 8A:
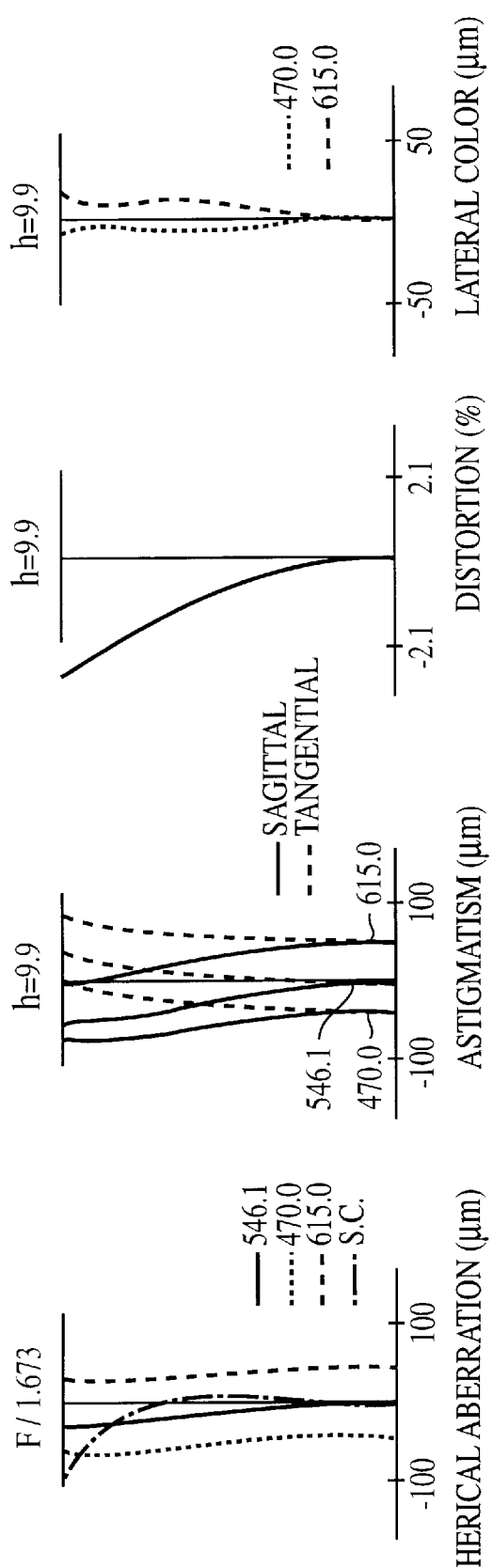
FIGS. 8(a)–8(d) show the spherical aberration, astigmatism, distortion and lateral color, respectively, of the projection lens of Embodiment 4.
Figure 8B:
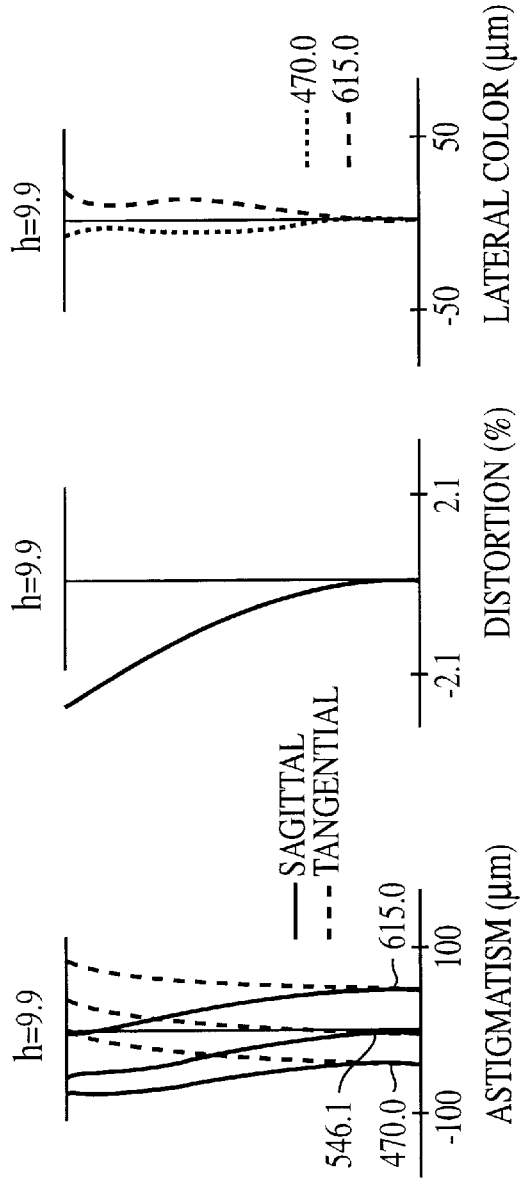
Figure 8C:
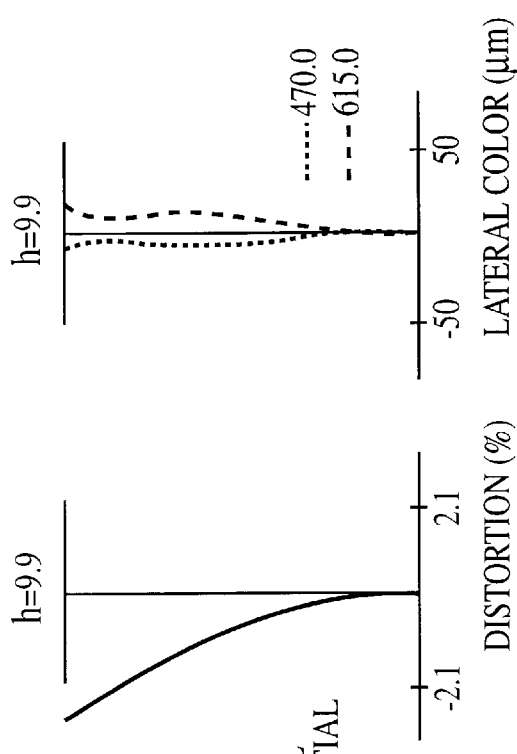
Figure 8D:
Figure 9A:
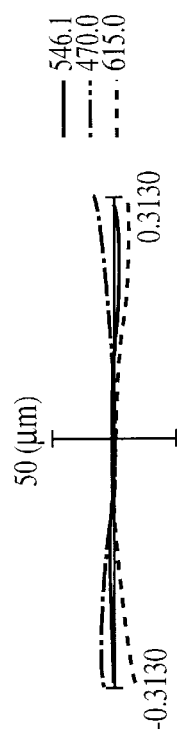
FIGS. 9(a)–9(g) show the coma of the projection lens of Embodiment 4.
Figure 9B:
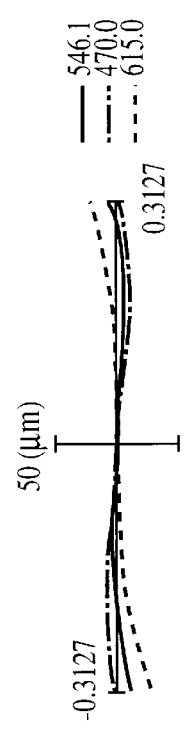
Figure 9C:
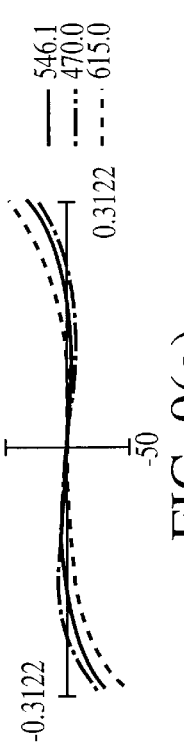
Figure 9D:
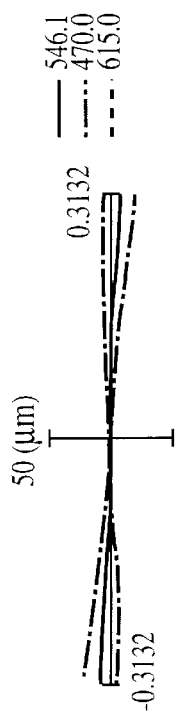
Figure 9E:
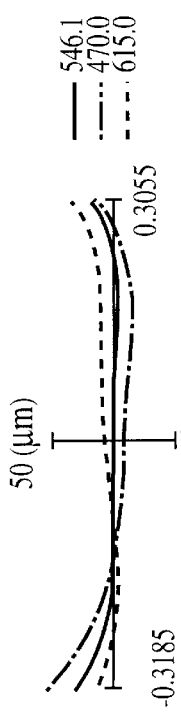
Figure 9F:
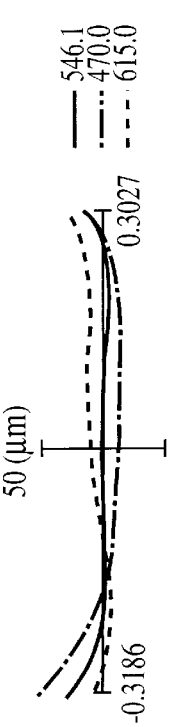
Figure 9G:
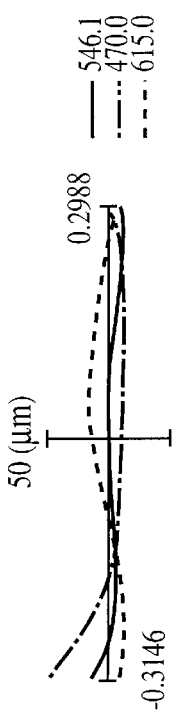

The present invention is to a projection lens that forms a bright image and wherein the light on the reducing side of the lens is nearly telecentric.

The projection lens of the present invention arranges, in order from the enlarging side of the projection lens; a first lens group having a single positive lens element; a second lens group having a single negative meniscus lens element; a third lens group having two lens elements, one of negative refractive power and one of positive refractive power, with a negative refractive power overall; a fourth lens group formed of a single positive lens element; and a fifth lens group formed of a single positive lens element. The projection lens is designed so that, on the reducing side, the telecentric angle is 2.5 degrees or less. Further, the following Conditions (1) and (2) are satisfied:

| | |
|---|---|
| $n_{AVE} > 1.75$ | Condition (1) |
| $40 < \nu_{AVE} < 55$ | Condition (2) | where $n_{AVE}$ is the average value of the refractive index of the positive lens elements in the projection lens, and $\nu_{AVE}$ is the average value of the Abbe constants of the positive lens elements in the projection lens.

It is desirable if the following Condition (3) is satisfied:

| | |
|---|---|
| $0.15 < F/F_{12} < 0.5$ | Condition (3) | where

F is the focal length of the projection lens, and $F_{12}$ is the composite focal length of the first lens group and the second lens group.

In addition, the negative meniscus lens element which forms the second lens group should, ideally, satisfy the following Conditions (4) and (5):

| | |
|---|---|
| $n_2 < 1.65$ | Condition (4) |
| $R_4/F > 0.32$ | Condition (5) | where n₂ is the refractive index of the negative meniscus lens element of the second lens group, $R_4$ is the radius of curvature of the surface on the reducing side of the negative meniscus lens element of the second lens group, and F is as defined above.

Further, it is desirable if the negative meniscus lens element of the second lens group satisfies the following Condition (6):

$$D_3/F < 0.2 \qquad \text{Condition (6)}$$

where $D_3$ is the central thickness of the negative meniscus lens element of the second lens group, and F is as defined above.

It is preferred that the third lens group be formed of a cemented lens which combines a negative lens element and a positive lens element. In addition, it is also preferred that the positive lens element that forms the first lens group include a convex surface on the enlarging side of the projection lens.

The technical significance of each of the respective Conditions (1) through (6) will now be described. Conditions (1) and (2) are for suppressing the peripheral darkening that normally accompanies the use of a low F-number lens. When falling below the lower limit of Condition (1), it becomes difficult to favorably correct the various aberrations that arise in a lens of low F-number; and, on the other hand, when going outside the range of the Condition (2), it becomes difficult to favorably correct the chromatic aberration.

Condition (3) is for favorably correcting various aberrations. When exceeding the upper limit of Condition (3), it becomes difficult to favorably correct aberrations, especially coma and lateral color. On the other hand, when falling below the lower limit of Condition (3), distortion becomes excessive.

Conditions (4) and (5) are for favorably correcting the curvature of field and coma. When exceeding the upper limit of Condition (4), tilt of the image cannot be corrected in conjunction with difficulty in keeping the Petzval sum small. On the other hand, when falling below the lower limit of Condition (5), coma (resulting from the surface of the negative meniscus lens element on the reducing side) increases, thereby making aberration correction difficult.

Furthermore, Condition (6) is for ensuring that the lens is compact. When exceeding the upper limit, the lens elements which compose the first lens group and the second lens group become excessively large.

Four different embodiments of the invention will now be described with reference to the figures. Each embodiment of the invention has a basic lens element construction roughly corresponding to that illustrated in FIG. 1.

Embodiment 1

The projection lens of this embodiment has the following lens element construction, in order from the enlarging side of the projection lens: a first lens element $L_1$ formed as a positive meniscus lens with its convex surface on the enlarging side of the projection lens; a second lens element $L_2$ formed of a negative meniscus lens with its convex surface on the enlarging side of the projection lens; a negative third lens element $L_3$ formed of a bi-concave lens having different surface powers, with the surface of stronger curvature on the enlarging side of the projection lens; a positive fourth lens element $L_4$ formed of a bi-convex lens having different surface powers with the surface of stronger curvature on the reducing side of the projection lens; a positive fifth lens element $L_5$ formed of a plano-convex lens with the convex surface on the reducing side of the projection lens; and a positive sixth lens element $L_6$ formed of a meniscus lens with its convex surface on the enlarging side of the projection lens.

Moreover, the first lens group $G_1$ is formed of the first lens element $L_1$, the second lens group $G_2$ is formed of the second lens element $L_2$, the third lens group $G_3$ is formed of the third lens element $L_3$ and the fourth lens element $L_4$, the fourth lens group $G_4$ is formed of the fifth lens element $L_5$, and the fifth lens group $G_5$ is formed of the sixth lens element $L_6$.

Furthermore, the lens construction satisfies the above Conditions (1) through (6).

A translucent liquid crystal display 1 and a color synthesis optical system 2 are arranged on the reducing side of the projection lens. The optical axis is at X, and 3 is a diaphragm stop. Thus, the luminous flux that enters the projection lens carries picture image information as a result of the light having been modulated by the liquid crystal display 1. The image is then enlarged and projected onto a screen (not shown in the figure) by the projection lens.

Table 1 lists the surface #, in order from the enlarging side of the projection lens, the radius of curvature R (in mm) of each lens element surface, the on-axis surface spacing D (in mm), as well as the index of refraction $N_e$ and the Abbe constant ve at the e-line (546.1 μm) for each lens element of Embodiment 1.

TABLE 1

| # | R | D | Ne | ve |
|---|---|---|---|---|
| 1 | 29.1576 | 7.82000 | 1.839292 | 37.1 |
| 2 | 79.1988 | 0.30000 | | |
| 3 | 26.8913 | 6.00000 | 1.534302 | 48.5 |
| 4 | 13.2102 | 10.03000 | | |
| 5 | ∞ | 6.46000 | | |
| 6 | −14.9408 | 4.13000 | 1.855042 | 23.6 |
| 7 | 82.9590 | 9.00000 | 1.776206 | 49.4 |
| 8 | −23.7507 | 0.30000 | | |
| 9 | ∞ | 7.27000 | 1.839615 | 42.3 |
| 10 | −38.0249 | 0.30000 | | |
| 11 | 43.7010 | 4.81000 | 1.839615 | 42.8 |
| 12 | 169.0343 | 7.00000 | | |
| 13 | ∞ | 32.00000 | 1.624084 | 36.0 |
| 14 | ∞ | 0.00000 | | |
| 15 | ∞ | 0.70000 | 1.460075 | 68.1 |
| 16 | ∞ | | | |

For this Embodiment, the F-number is 1.7, the telecentric angle is 1.4 degrees, and the peripheral brightness is 96% as compared to the brightness at the center of the lens; moreover, Conditions (1)–(6) are satisfied.

Embodiment 2

The lens of Embodiment 2 has about the same lens element construction as that of the lens of Embodiment 1, described above. However, Embodiment 2 differs from FIG. 1, in that the fifth lens element $L_5$ of Embodiment 2 is a positive meniscus lens with its convex surface on the reducing side.

Table 2 lists the surface #, in order from the enlarging side of the projection lens, the radius of curvature R (in mm) of each lens element surface, the on-axis surface spacing D (in mm), as well as the index of refraction $N_e$ and the Abbe constant ve at the e-line (546.1 μm) for each lens element of Embodiment 2.

TABLE 2

| # | R | D | Ne | ve |
|---|---|---|---|---|
| 1 | 29.8656 | 7.57000 | 1.839615 | 42.8 |
| 2 | 83.5318 | 0.93000 | | |
| 3 | 27.1074 | 6.00000 | 1.489140 | 70.2 |
| 4 | 12.8483 | 10.00000 | | |
| 5 | ∞ | 6.39000 | | |
| 6 | −15.2177 | 4.44000 | 1.855042 | 23.6 |
| 7 | 80.0100 | 9.01000 | 1.776206 | 49.4 |
| 8 | −23.9848 | 0.30000 | | |
| 9 | −1512.9132 | 6.84000 | 1.839615 | 42.8 |
| 10 | −37.2477 | 0.30000 | | |
| 11 | 43.3879 | 5.10000 | 1.839615 | 42.8 |
| 12 | 150.9418 | 7.00000 | | |
| 13 | ∞ | 32.00000 | 1.624084 | 36.0 |
| 14 | ∞ | 0.00000 | | |
| 15 | ∞ | 0.70000 | 1.460075 | 68.1 |
| 16 | ∞ | | | |

For this embodiment the F-number is 1.7, the telecentric angle is 1.5 degrees, and the peripheral brightness is 95% compared to that at the center of the lens; moreover, Conditions (1)–(6) are satisfied.

Embodiment 3

The lens of Embodiment 3 has nearly the same lens element construction as that of Embodiment 1. Embodiment 3 differs only in that the fifth lens element $L_5$ is a bi-convex lens having surfaces of different power, with the surface having the stronger curvature being on the reducing side.

Table 3 lists the surface #, in order from the enlarging side of the projection lens, the radius of curvature R (in mm) of each lens element surface, the on-axis surface spacing D (in mm), as well as the index of refraction $N_e$ and the Abbe constant ve at the e-line (546.1 μm) for each lens element of Embodiment 3.

TABLE 3

| # | R | D | Ne | ve |
|---|---|---|---|---|
| 1 | 19.8309 | 5.65000 | 1.608907 | 43.4 |
| 2 | 66.9112 | 0.30000 | | |
| 3 | 21.8427 | 3.50000 | 1.584810 | 40.6 |
| 4 | 13.1139 | 6.27000 | | |
| 5 | ∞ | 8.98000 | | |
| 6 | −12.7610 | 5.00000 | 1.855042 | 23.6 |
| 7 | 182.8704 | 9.00000 | 1.808311 | 46.3 |
| 8 | −23.1413 | 0.30000 | | |
| 9 | 1064.6856 | 9.60000 | 1.839615 | 42.8 |
| 10 | −45.2881 | 0.30000 | | |
| 11 | 46.4007 | 6.00000 | 1.839615 | 42.8 |
| 12 | 270.1556 | 7.00000 | | |
| 13 | ∞ | 32.00000 | 1.624084 | 36.0 |
| 14 | ∞ | 0.00000 | | |
| 15 | ∞ | 0.70000 | 1.460075 | 68.1 |
| 16 | ∞ | | | |

For this embodiment the F-number is 1.7, the telecentric angle is 2.1 degrees, and the peripheral brightness is 96% compared to the brightness at the center of the lens; moreover, Conditions (1)–(6) are satisfied.

Embodiment 4

The lens of Embodiment 4 has the same lens element types as that of the lens of Embodiment 3, described above. Table 4 lists the surface #, in order from the enlarging side of the projection lens, the radius of curvature R (in mm) of each lens element surface, the on-axis surface spacing D (in mm), as well as the index of refraction $N_e$ and the Abbe constant ve at the e-line (546.1 μm) for each lens element of Embodiment 4.

TABLE 4

| # | R | D | Ne | ve |
|---|---|---|---|---|
| 1 | 26.6959 | 8.00091 | 1.839319 | 36.9 |
| 2 | 60.1955 | 0.30000 | | |
| 3 | 24.1386 | 5.66029 | 1.652217 | 33.5 |
| 4 | 12.3940 | 10.00000 | | |
| 5 | ∞ | 6.31000 | | |
| 6 | −15.0654 | 3.92405 | 1.761666 | 27.3 |
| 7 | 73.5570 | 9.00008 | 1.732333 | 54.4 |
| 8 | −22.9801 | 0.30000 | | |
| 9 | 1526.3124 | 10.00356 | 1.776205 | 49.3 |
| 10 | −38.4678 | 0.30000 | | |
| 11 | 39.1598 | 5.00754 | 1.808105 | 46.3 |
| 12 | 115.7460 | 6.99534 | | |
| 13 | ∞ | 32.00000 | 1.624084 | 36.0 |
| 14 | ∞ | 0.00000 | | |
| 15 | ∞ | 0.70000 | 1.460075 | 68.1 |
| 16 | ∞ | | | |

For this embodiment, the F-number is 1.7, the telecentric angle is 1.1 degrees, and the peripheral brightness is 98% compared to the brightness at the center of the lens; moreover, Conditions (1)–(6) are satisfied.

Table 5 summarizes the F-number, the half-field angle (in degrees), the telecentric angle, in degrees, and the percentage of light at the periphery of the lens (as compared to its center), as well as the values for the variable term in each of Conditions (1) through (6) for each of Embodiments (1)–(4).

TABLE 5

| | Embodiment 1 | Embodiment 2 | Embodiment 3 | Embodiment 4 |
|---|---|---|---|---|
| F No. | 1.7 | 1.7 | 1.7 | 1.7 |
| Half-field angle (degrees) | 15.8 | 15.8 | 16.1 | 16.0 |
| Telecentric angle (degrees) | 1.4 | 1.5 | 2.1 | 1.1 |
| Peripheral Brightness (%) | 96 | 95 | 96 | 98 |
| Condition (1) | 1.82 | 1.82 | 1.77 | 1.79 |
| Condition (2) | 43 | 44 | 44 | 44 |
| Condition (3) | 0.26 | 0.25 | 0.4 | 0.18 |
| Condition (4) | 1.53 | 1.49 | 1.58 | 1.65 |
| Condition (5) | 0.38 | 0.37 | 0.37 | 0.35 |
| Condition (6) | 0.17 | 0.17 | 0.1 | 0.16 |

As can be seen from Table 5, each of Embodiments 1–4 yield a bright projection lens having a low F-number value of 1.7, a half-field angle in the range 15.8–16.1 degrees, a telecentric angle in the range 1.1–2.1 degrees, a peripheral brightness in the range 95–98% as compared to the brightness at the center of the lens, and each of Conditions (1)–(6), as set forth above, is satisfied.

Moreover, the spherical aberration, astigmatism, distortion and lateral color for Embodiments 1–4 are shown in FIGS. 2, 4, 6 and 8, respectively. The symbol "h" in each of these figures indicates the height of the image. In addition, in each illustration of spherical aberration, the sine condition S.C. illustrated is for light of wavelength 615.0 μm, and the spherical aberration and astigmatism illustrated are for light of wavelengths 546.1 μm, 470.0 μm and 615.0 μm. Furthermore, the stigmatism is illustrated for light in both the sagittal (S) and a tangential (T) image planes.

The coma for each of Embodiments 1–4 is shown in FIGS. 3, 5, 7 and 9, respectively. In each of these drawing sheets, coma in the tangential direction is illustrated by the four curves in the left column, and coma in the sagittal direction is illustrated by the three curves in the right column. The curves from top to bottom of a drawing sheet represent the coma at different picture angles. The curve at the top of the left column illustrates the tangential coma on-axis, the curve beneath this represents the tangential coma at 50% maximum image height, the next curve beneath this represents the tangential coma at 70% maximum image height, and the bottom curve represents the tangential coma at maximum image height. For illustrating the coma in the sagittal direction, only three curves are given, since the sagittal coma on-axis is identical to the tangential coma on-axis. Thus, the remaining curves in the right column of each of the drawing sheets of FIGS. 3, 5, 7 and 9 (from top to bottom) illustrate the sagittal coma at an image height corresponding 50% maximum image height, 70% maximum image height, and at maximum image height, respectively.

As is evident from FIGS. 2 through 9, it is possible to make each of the aberrations favorable. Moreover, the projection lens of the present invention is not limited to the above Embodiments 1–4, as various changes are possible. For example, the radius of curvature R and the surface spacings D of each lens surface may be varied. Moreover, although the projection lens of the embodiments described above are intended for use with a translucent-type liquid crystal display, the present invention may also be used with reflective-type liquid crystal display, or with other types of light modulators, such as digital mirror devices, deformable mirror devices, and so on.

According to the present invention, by satisfying the Conditions (1) and (2), it is possible to favorably suppress peripheral darkening while favorably correcting various aberrations, despite the lens having a low F-number. Since the telecentric angle is 2.5 degrees or less, the light is nearly collimated on the reducing side of the lens. Thus, it is possible for light to illuminate the back side of the liquid crystal display nearly orthogonally, for it to be modulated by the liquid crystal display and for the image contained in the light to then be projected by the projection lens onto a screen positioned on the enlarging side of the projection lens. In this manner, even for light rays passing through the periphery of the lens, unnecessary peripheral darkening of the projected image is avoided.

In addition, it is possible for various aberrations such as a coma, lateral color, and curvature of field to be favorably corrected by satisfying Conditions (3)–(5). By satisfying Condition (6) a compact projection lens is obtained.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A projection lens having an enlarging side and a reducing side, said projection lens comprising, in order from the enlarging side of the projection lens:

a first lens group consisting of a single positive lens element;

a second lens group consisting of a single negative meniscus lens element;

a third lens group having negative refractive power and formed of a negative lens element and a positive lens element;

a fourth lens group consisting of a single positive lens element; and, a fifth lens group consisting of a single positive lens element, wherein the maximum angle of a principal ray relative to the optical axis on the reducing side of the projection lens is 2.5 degrees or less, and the following conditions are satisfied $n_{AVE} > 1.75$ $40 < v_{AVE} < 55$ where $n_{AVE}$ is the average value of the refractive index of the positive lens elements of said projection lens, and $v_{AVE}$ is the average value of the Abbe constant of the positive lens element of said projection lens.

2. The projection lens of claim 1, wherein the following condition is satisfied:

$0.15 < F/F_{12} < 0.5$ where

F is the focal length of the projection lens, and $F_{12}$ is the composite focal length of the first lens group and the second lens group.

3. The projection lens of claim 2, wherein the negative meniscus lens element which forms the second lens group satisfies the following conditions $n_2 < 1.65$ $R_4/F > 0.32$ where $n_2$ is the refractive index of the negative meniscus lens element of the second lens group, $R_4$ is the curvature radius of the surface of the reducing side of the negative meniscus lens element of the second lens group, and F is the focal length of the projection lens.

4. The projection lens of claim 3, wherein the third lens group is formed of a negative lens element and a positive lens element that are cemented together.

5. The projection lens of claim 3, wherein the positive lens element that forms the first lens group is arranged so that a convex surface is on the enlarging side of the projection lens.

6. The projection lens of claim 2, wherein the negative meniscus lens element that forms the second lens group satisfies the following condition $D_3/F < 0.2$ where:

$D_3$ is the central thickness of the negative meniscus lens element of the second lens group, and F is the focal length of the projection lens.

7. The projection lens of claim 2, wherein the third lens group is formed of a negative lens element and a positive lens element that are cemented together.

8. The projection lens of claim 2 wherein the positive lens element that forms the first lens group is arranged so that a convex surface is on the enlarging side of the projection lens.

9. The projection lens of claim 1, wherein the negative meniscus lens element which forms the second lens group satisfies the following condition.

$n_2 < 1.65$ $R_4/F > 0.32$ where
- $n_2$ is the refractive index of the negative meniscus lens element of the second lens group,
- $R_4$ is the curvature radius of the surface of the reducing side of the negative meniscus lens element of the second lens group, and
- F is the focal length of the projection lens.

10. The projection lens of claim 9, wherein the negative meniscus lens element that forms the second lens group satisfies the following condition $$D_3/F<0.2$$

where:
- $D_3$ is the central thickness of the negative meniscus lens element of the second lens group, and
- F is the focal length of the projection lens.

11. The projection lens of claim 9, wherein the third lens group is formed of a negative lens element and a positive lens element that are cemented together.

12. The projection lens of claim 9, wherein the positive lens element that forms the first lens group is arranged so that a convex surface is on the enlarging side of the projection lens.

13. The projection lens of claim 1, wherein the negative meniscus lens element that forms the second lens group satisfies the following condition $$D_3/F<0.2$$

where
- $D_3$ is the central thickness of the negative meniscus lens element of the second lens group, and
- F is the focal length of the projection lens.

14. The projection lens of claim 13, wherein the positive lens element that forms the first lens group is arranged so that a convex surface is on the enlarging side of the projection lens.

15. The projection lens of claim 1, wherein the third lens group is formed of a negative lens element and a positive lens element that are cemented together.

16. The projection lens of claim 1 wherein the positive lens element that forms the first lens group is arranged so that a convex surface is on the enlarging side of the projection lens.

17. A projection lens having an enlarging side and a reducing side, said projection lens comprising, in order from the enlarging side of the projection lens:
- a first lens group including a positive lens element;
- a second lens group including a negative meniscus lens element;
- a third lens group having negative refractive power and formed of a negative lens element and a positive lens element;
- a fourth lens group including a positive lens element; and,
- a fifth lens group including positive lens element, wherein
the maximum angle of a principal ray relative to the optical axis on the reducing side of the projection lens is 2.5 degrees or less, and the following conditions are satisfied $$n_{AVE}>1.75$$

$$40<v_{AVE}<55$$

where
- $n_{AVE}$ is the average value of the refractive index of the positive lens elements of said projection lens, and
- $v_{AVE}$ is the average value of the Abbe constant of the positive lens element of said projection lens.

18. The projection lens of claim 17, wherein the following condition is satisfied:

$$0.15<F/F_{12}<0.5$$

where
- F is the focal length of the projection lens, and
- $F_{12}$ is the composite focal length of the first lens group and the second lens group.

19. The projection lens of claim 18, wherein the negative meniscus lens element which forms the second lens group satisfies the following conditions.

$$n_2<1.65$$

$$R_4/F>0.32$$

where
- $n_2$ is the refractive index of the negative meniscus lens element of the second lens group,
- $R_4$ is the curvature radius of the surface of the reducing side of the negative meniscus lens element of the second lens group, and
- F is the focal length of the projection lens.

20. The projection lens of claim 19, wherein the negative meniscus lens element that forms the second lens group satisfies the following condition $$D_3/F<0.2$$

where
- $D_3$ is the central thickness of the negative meniscus lens element of the second lens group, and
- F is the focal length of the projection lens.

* * * * *

UNITED STATES PATENT AND TRADEMARK OFFICE
CERTIFICATE OF CORRECTION

PATENT NO : 6,124,978
DATED : September 26, 2000
INVENTOR(S): Yoneyama It is certified that error appears in the above-identified patent and that said Letters Patent are hereby corrected as shown below:

In Table 1, change the value of "$\nu e$" for surface #9, from "42.3" to - - 42.8 - -;

At column 6, line 45, change "yield" to - - yields - - ;

At column 7, line 24, before "reflective-type", insert - - a - - ;

In claim 1, last line, change "element" to - - elements - -.

Signed and Sealed this

Eighth Day of May, 2001

*Attest:*

NICHOLAS P. GODICI

*Attesting Officer*   *Acting Director of the United States Patent and Trademark Office*